United States Patent
Terada et al.

(10) Patent No.: US 11,448,625 B2
(45) Date of Patent: Sep. 20, 2022

(54) CONTROL DEVICE FOR CHROMATOGRAPH APPARATUS

(71) Applicant: Shimadzu Corporation, Kyoto (JP)

(72) Inventors: Hidetoshi Terada, Kyoto (JP); Hiroshi Ohashi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 502 days.

(21) Appl. No.: 16/477,000

(22) PCT Filed: Jan. 10, 2017

(86) PCT No.: PCT/JP2017/000449
§ 371 (c)(1),
(2) Date: Jul. 10, 2019

(87) PCT Pub. No.: WO2018/131068
PCT Pub. Date: Jul. 19, 2018

(65) Prior Publication Data
US 2019/0369070 A1   Dec. 5, 2019

(51) Int. Cl.
*G01N 30/88* (2006.01)
*G01N 30/34* (2006.01)
*G01N 30/74* (2006.01)
*G01N 30/86* (2006.01)
*G01N 30/30* (2006.01)

(52) U.S. Cl.
CPC ............ *G01N 30/88* (2013.01); *G01N 30/34* (2013.01); *G01N 30/74* (2013.01); *G01N 30/86* (2013.01);
(Continued)

(58) Field of Classification Search
CPC ........ G01N 30/88; G01N 30/34; G01N 30/74; G01N 30/86; G01N 30/8696; G01N 2030/3076; G01N 2030/8804
See application file for complete search history.

(56) References Cited

U.S. PATENT DOCUMENTS

2013/0018598 A1   1/2013   Ohashi et al.
2013/0048095 A1*  2/2013   Wikfors ............... F04B 23/06
                                                  137/7
(Continued)

FOREIGN PATENT DOCUMENTS

CN   102879508 A   1/2013
CN   103575825 A   2/2014
(Continued)

OTHER PUBLICATIONS

International Search Report dated Apr. 11, 2017 in corresponding International Application No. PCT/JP2017/000449; 4 pages.
(Continued)

*Primary Examiner* — Benjamin R Schmitt
(74) *Attorney, Agent, or Firm* — Maier & Maier, PLLC

(57) ABSTRACT

A chromatograph apparatus control device according to the present disclosure is a control device for controlling a chromatograph apparatus having the function of a liquid chromatograph and that of a supercritical fluid chromatograph. The control device includes a first-type method file creator configured to create a first-type method file describing a condition of an analysis by a liquid chromatograph; a second-type method file creator configured to create a second-type method file describing a condition of an analysis by a supercritical fluid chromatograph; and a batch file creator configured to create a single batch file including a plurality of records describing a group of method files including the first-type method file and the second-type method file, with one method file in each record.

9 Claims, 10 Drawing Sheets

(52) U.S. Cl.
CPC . *G01N 30/8696* (2013.01); *G01N 2030/3076* (2013.01); *G01N 2030/8804* (2013.01)

(56) References Cited

U.S. PATENT DOCUMENTS

| | | |
|---|---|---|
| 2014/0040323 A1 | 2/2014 | Nakao et al. |
| 2015/0253294 A1 | 9/2015 | Ohashi |
| 2016/0202218 A1 | 7/2016 | Owa |
| 2019/0056361 A1* | 2/2019 | Ono .................. G01N 30/8655 |

FOREIGN PATENT DOCUMENTS

| | | |
|---|---|---|
| CN | 104897788 A | 9/2015 |
| CN | 105784856 A | 7/2016 |
| JP | S58-502066 A | 12/1983 |
| JP | S63-265164 A | 11/1988 |
| JP | 2013-024603 A | 2/2013 |
| JP | 2014-029270 A | 2/2014 |
| JP | 2015-166725 A | 9/2015 |
| JP | 2016-008908 A | 1/2016 |
| JP | 2016-130691 A | 7/2016 |
| WO | 1983/02160 A1 | 6/1983 |

OTHER PUBLICATIONS

Written Opinion dated Apr. 11, 2017 in corresponding International Application No. PCT/JP2017/000449; 9 pages; Machine translation attached.

* cited by examiner

| Analysis | Vial | Sample Name | Base Method | Data File | Amount of Injection | Column | Pump B | Pump C | Initial Concentration | Final Concentration |
|---|---|---|---|---|---|---|---|---|---|---|
| SFC1 | 1 | test1 | SFC_analysis.lcm | test1_1UCRP_MeOH_20_40 | 1 | 1UCRP | MeOH | | 20 | 40 |
| SFC2 | 2 | test2 | SFC_analysis.lcm | test2_1UCRP_MeOH_20_40 | 1 | 1UCRP | MeOH | | 20 | 40 |
| SFC3 | 3 | test3 | SFC_analysis.lcm | test3_1UCRP_MeOH_20_40 | 1 | 1UCRP | MeOH | | 20 | 40 |
| SFC4 | 4 | test4 | SFC_analysis.lcm | test4_1UCRP_MeOH_20_40 | 1 | 1UCRP | MeOH | | 20 | 40 |
| SFC5 | 1 | test1 | SFC_analysis.lcm | test1_2UCSL_MeOH_20_40 | 1 | 2UCSL | MeOH | | 20 | 40 |
| SFC6 | 2 | test2 | SFC_analysis.lcm | test2_2UCSL_MeOH_20_40 | 1 | 2UCSL | MeOH | | 20 | 40 |
| SFC7 | 3 | test3 | SFC_analysis.lcm | test3_2UCSL_MeOH_20_40 | 1 | 2UCSL | MeOH | | 20 | 40 |
| SFC8 | 4 | test4 | SFC_analysis.lcm | test4_2UCSL_MeOH_20_40 | 1 | 2UCSL | MeOH | | 20 | 40 |

Fig. 7

| Analysis | Vial | Sample Name | Base Method | Data File | Amount of Injection | Column | Pump B | Pump C | Initial Concentration | Final Concentration | |
|---|---|---|---|---|---|---|---|---|---|---|---|
| LC1 | 1 | test1 | LC_analysis.lcm | test1_7\PODS_MeOH_Water_5_90 | 1 | 7:\PODS | MeOH | Water | 5 | 90 | ... |
| LC2 | 2 | test2 | LC_analysis.lcm | test2_7\PODS_MeOH_Water_5_90 | 1 | 7:\PODS | MeOH | Water | 5 | 90 | ... |
| LC3 | 3 | test3 | LC_analysis.lcm | test3_7\PODS_MeOH_Water_5_90 | 1 | 7:\PODS | MeOH | Water | 5 | 90 | ... |
| LC4 | 4 | test4 | LC_analysis.lcm | test4_7\PODS_MeOH_Water_5_90 | 1 | 7:\PODS | MeOH | Water | 5 | 90 | ... |
| LC5 | 1 | test1 | LC_analysis.lcm | test1_8:\VPC8_MeOH_Water_5_90 | 1 | 8:\VPC8 | MeOH | Water | 5 | 90 | ... |
| LC6 | 2 | test2 | LC_analysis.lcm | test2_8:\VPC8_MeOH_Water_5_90 | 1 | 8:\VPC8 | MeOH | Water | 5 | 90 | ... |
| LC7 | 3 | test3 | LC_analysis.lcm | test3_8:\VPC8_MeOH_Water_5_90 | 1 | 8:\VPC8 | MeOH | Water | 5 | 90 | ... |
| LC8 | 4 | test4 | LC_analysis.lcm | test4_8:\VPC8_MeOH_Water_5_90 | 1 | 8:\VPC8 | MeOH | Water | 5 | 90 | ... |

Fig. 9

| Record | Analysis | Vial | Sample Name | Base Method | Data File | Amount of Injection | Column | Pump B | Pump C | Initial Concentration | Final Concentration |
|---|---|---|---|---|---|---|---|---|---|---|---|
| 1 | SFC1 | -1 | | LC_to_SFC.lcm | | | 1:JCRP | MeOH | | | |
| 2 | SFC2 | -1 | | LC_to_SFC.lcm | | | 2:JCSIL | MeOH | | | |
| 3 | SFC3 | 1 | test1 | SFC_analysis.lcm | test1_1JCRP_MeOH_20_40 | 1 | 1:JCRP | MeOH | | 20 | 40 |
| 4 | SFC4 | 2 | test2 | SFC_analysis.lcm | test2_1JCRP_MeOH_20_40 | 1 | 1:JCRP | MeOH | | 20 | 40 |
| 5 | SFC5 | 3 | test3 | SFC_analysis.lcm | test3_1JCRP_MeOH_20_40 | 1 | 1:JCRP | MeOH | | 20 | 40 |
| 6 | SFC6 | 4 | test4 | SFC_analysis.lcm | test4_1JCRP_MeOH_20_40 | 1 | 1:JCRP | MeOH | | 20 | 40 |
| 7 | | -1 | | SFC_EQ.lcm | | | | | | | |
| 8 | SFC5 | 1 | test1 | SFC_analysis.lcm | test1_2JCSIL_MeOH_20_40 | 1 | 2:JCSIL | MeOH | | 20 | 40 |
| 9 | SFC6 | 2 | test2 | SFC_analysis.lcm | test2_2JCSIL_MeOH_20_40 | 1 | 2:JCSIL | MeOH | | 20 | 40 |
| 10 | SFC7 | 3 | test3 | SFC_analysis.lcm | test3_2JCSIL_MeOH_20_40 | 1 | 2:JCSIL | MeOH | | 20 | 40 |
| 11 | SFC8 | 4 | test4 | SFC_analysis.lcm | test4_2JCSIL_MeOH_20_40 | 1 | 2:JCSIL | MeOH | | 20 | 40 |
| 12 | | -1 | | SFC_to_LC.lcm | | | 7:VPODS | MeOH | Water | | |
| 13 | | -1 | | SFC_to_LC.lcm | | | 8:VPC8 | MeOH | Water | | |
| 14 | LC1 | 1 | test1 | LC_analysis.lcm | test1_7VPODS_MeOH_Water_5_90 | 1 | 7:VPODS | MeOH | Water | 5 | 90 |
| 15 | LC2 | 2 | test2 | LC_analysis.lcm | test2_7VPODS_MeOH_Water_5_90 | 1 | 7:VPODS | MeOH | Water | 5 | 90 |
| 16 | LC3 | 3 | test3 | LC_analysis.lcm | test3_7VPODS_MeOH_Water_5_90 | 1 | 7:VPODS | MeOH | Water | 5 | 90 |
| 17 | LC4 | 4 | test4 | LC_analysis.lcm | test4_7VPODS_MeOH_Water_5_90 | 1 | 7:VPODS | MeOH | Water | 5 | 90 |
| 18 | | -1 | | LC_EQ.lcm | | | | | | | |
| 19 | LC5 | 1 | test1 | LC_analysis.lcm | test1_8VPC8_MeOH_Water_5_90 | 1 | 8:VPC8 | MeOH | Water | 5 | 90 |
| 20 | LC6 | 2 | test2 | LC_analysis.lcm | test2_8VPC8_MeOH_Water_5_90 | 1 | 8:VPC8 | MeOH | Water | 5 | 90 |
| 21 | LC7 | 3 | test3 | LC_analysis.lcm | test3_8VPC8_MeOH_Water_5_90 | 1 | 8:VPC8 | MeOH | Water | 5 | 90 |
| 22 | LC8 | 4 | test4 | LC_analysis.lcm | test4_8VPC8_MeOH_Water_5_90 | 1 | 8:VPC8 | MeOH | Water | 5 | 90 |

Fig. 10

| Record | Analysis | Vial | Sample Name | Base Method | Column | Pump B | Pump C | Initial Concentration | Final Concentration |
|---|---|---|---|---|---|---|---|---|---|
| 1 | | -1 | | LC_to_SFC.lcm | 1:LCRP | MeOH | | | |
| 2 | | -1 | | LC_to_SFC.lcm | 2:LCSIL | MeOH | | | |
| 3 | SFC1 | 1 | test1 | SFC_analysis.lcm | 3:VPCRP | MeOH | | 20 | 40 |
| 4 | SFC2 | 2 | test2 | SFC_analysis.lcm | 3:VPCRP | MeOH | | 20 | 40 |
| 5 | SFC3 | 3 | test3 | SFC_analysis.lcm | 3:VPCRP | MeOH | | 20 | 40 |
| 6 | SFC4 | 4 | test4 | SFC_analysis.lcm | 3:VPCRP | MeOH | | 20 | 40 |
| 7 | | -1 | | SFC_EQ.lcm | | MeOH | | 20 | 40 |
| 8 | SFC5 | 1 | test1 | SFC_analysis.lcm | 4:VPCSIL | MeOH | | 20 | 40 |
| 9 | SFC6 | 2 | test2 | SFC_analysis.lcm | 4:VPCSIL | MeOH | | 20 | 40 |
| 10 | SFC7 | 3 | test3 | SFC_analysis.lcm | 4:VPCSIL | MeOH | | 20 | 40 |
| 11 | SFC8 | 4 | test4 | SFC_analysis.lcm | 4:VPCSIL | MeOH | | 20 | 40 |
| 12 | | -1 | | SFC_to_LC.lcm | 7:VPODS | MeOH | Water | 5 | 90 |
| 13 | | -1 | | SFC_to_LC.lcm | 8:VPSIL | MeOH | Water | 5 | 90 |
| 14 | LC1 | 1 | test1 | LC_analysis.lcm | 7:VPODS | MeOH | Water | 5 | 90 |
| 15 | LC2 | 2 | test2 | LC_analysis.lcm | 7:VPODS | MeOH | Water | 5 | 90 |
| 16 | LC3 | 3 | test3 | LC_analysis.lcm | 7:VPODS | MeOH | Water | 5 | 90 |
| 17 | LC4 | 4 | test4 | LC_analysis.lcm | 7:VPODS | MeOH | Water | 5 | 90 |
| 18 | | -1 | | LC_EQ.lcm | 8:VPCSIL | MeOH | Water | 5 | 90 |
| 19 | LC5 | 1 | test1 | LC_analysis.lcm | 8:VPCSIL | MeOH | Water | 5 | 90 |
| 20 | LC6 | 2 | test2 | LC_analysis.lcm | 8:VPCSIL | MeOH | Water | 5 | 90 |
| 21 | LC7 | 3 | test3 | LC_analysis.lcm | 8:VPCSIL | MeOH | Water | 5 | 90 |
| 22 | LC8 | 4 | test4 | LC_analysis.lcm | 8:VPCSIL | MeOH | Water | 5 | 90 |

CONTROL DEVICE FOR CHROMATOGRAPH APPARATUS

FIELD

The present disclosure relates to a control device for controlling a chromatograph apparatus having both an analytical function using a liquid chromatograph and an analytical function using a supercritical fluid chromatograph.

BACKGROUND

Liquid chromatographs (LCs), which use a liquid as a mobile phase, have been commonly known as one type of chromatographic technique. In recent years, supercritical fluid chromatographs (SFCs), which use a supercritical fluid as a mobile phase, have also been drawing attention (Patent Literature 1).

The supercritical fluid is a fluid at a temperature and pressure above its critical point (critical temperature and critical pressure). Supercritical fluids are characterized by low viscosity and high diffusivity. Using such a fluid as a mobile phase makes it possible to increase the flow velocity of the mobile phase and complete the analysis within a shorter period of time. The eluting power of the supercritical fluid can be changed by adding a polar solvent (modifier) to the fluid and/or changing the temperature or pressure (back pressure) of the fluid. This has the advantage that the separation mode can be selected from a wide variety of options. As a substance for the supercritical mobile phase, carbon dioxide is commonly used since its supercritical temperature is comparatively close to room temperature, and furthermore, its flammability and chemical reactivity is considerably low.

The liquid chromatograph and the supercritical fluid chromatograph differ from each other in their separation and selection performances. The use of the two types of devices in an analysis enables an exhaustive analysis of a wide variety of compounds. Accordingly, a chromatograph apparatus having both an analytical function using a liquid chromatograph and an analytical function using a supercritical fluid chromatograph (LC-SFC apparatus) has been proposed (Patent Literature 2).

CITATION LIST

Patent Literature

Patent Literature 1: JP 2016-008908 A
Patent Literature 2: JP 2016-130691 A

SUMMARY

A chromatograph apparatus normally has a control device connected to it, allowing a user to set analysis conditions and other items of information as needed. The control device operates the chromatograph apparatus according to the set analysis conditions and makes the apparatus perform a chromatographic analysis specified by the user.

More specifically, a user operating the control device prepares one method file which describes various analysis conditions required for performing one chromatographic analysis. In many cases, users desire to continuously perform a plurality of chromatographic analyses for some purposes, e.g. in order to analyze the same sample under different analysis conditions. In that case, the user operating the control device prepares a plurality of method files for each of the group of chromatographic analyses and additionally creates a single batch file in which one of the plurality of method files is described in each record. Upon receiving a batch file created in this manner, the control device sequentially reads the method files respectively described in the records in the batch file and makes the chromatograph apparatus continuously perform chromatographic analyses according to those method files. The analysis result obtained by each individual chromatographic analysis is sent from the chromatograph apparatus to the control device. The control device manages the acquired analysis results by linking each analysis result with the corresponding record in the batch file.

Most of the conventionaly and commonly used chromatograph apparatuses have only the analytical function of either a liquid chromatograph or supercritical fluid chromatograph (i.e. either an LC apparatus or SFC apparatus). Accordingly, most of the control devices for those apparatuses have also been designed to create either a batch file which contains only the method files for a liquid chromatograph (LC method files) or a batch file which contains only the method files for a supercritical fluid chromatograph (SFC method files).

LC-SFC apparatuses which have both an analytical function using a liquid chromatograph and an analytical function using a supercritical fluid chromatograph have also been conventionally available. However, the control devices for such apparatuses have been designed according to the common specifications as described earlier. Accordingly, if the user has specified LC method files and SFC method files which should be continuously executed, the control device individually creates a batch file which contains only the LC method files and another batch file which contains only the SFC method files. The control device makes the LC-SFC apparatus perform one chromatographic analysis after another described in each batch file while switching between the two batch files.

According to such a configuration, the LC method files and the SFC method files are described in separate batch files. Therefore, the management of the analysis conditions, analysis results and other related information will be extremely cumbersome. This prevents the LC-SFC apparatus from exhibiting its significant advantages, such as the capability to exhaustively analyze a wide variety of compounds in a sample by continuously performing a series of chromatographic analyses on the same sample while switching between the liquid chromatograph and the supercritical fluid chromatograph. With the LC method files and the SFC method files described in separate batch files, it will be impossible to manage analysis conditions, analysis results and other related information in a continuous flow of operations (i.e. in one batch sequence). Accordingly, in terms of such a management task, there is no sufficiently significant advantage over the case of using two individual apparatuses, i.e. the LC apparatus and the SFC apparatus, in combination.

The present invention has been developed to solve the previously described problem. Its objective is to provide a technique which makes it easy to manage analysis conditions, analysis results and other related information in a chromatograph apparatus having both an analytical function using a liquid chromatograph and an analytical function using a supercritical fluid chromatograph.

The present invention developed for solving the previously described problem is a control device for controlling a chromatograph apparatus having an analytical function using a liquid chromatograph and an analytical function using a supercritical fluid chromatograph, the control device including:

a first-type method file creator configured to create a first-type method file according to an instruction from a user, the first-type method file describing a condition of an analysis by a liquid chromatograph;

a second-type method file creator configured to create a second-type method file according to an instruction from a user, the second-type method file describing a condition of an analysis by a supercritical fluid chromatograph; and a batch file creator configured to create a batch file according to an instruction from a user after a group of method files including one or more first-type method files and one or more second-type method files are created, the batch file including a plurality of records describing the group of method files, with one method file in each record.

According to this configuration, a single batch file can be obtained in which a first-type method file describing the condition of an analysis by a liquid chromatograph and a second-type method file describing the condition of an analysis by a supercritical fluid chromatograph are described. With the single batch file obtained in this manner, the user can manage those analysis conditions as well as the analysis results and other related information in a single batch sequence. Accordingly, it will be easy to manage analysis conditions, analysis results and other related information.

As a preferable mode, the control device may further include a display controller configured to display the batch file on a display device, where the display controller is further configured to display the first-type method files and the second-type method files in respective display modes which differ from each other.

The "display in display modes which differ from each other" can specifically be achieved, for example, by varying at least one property selected from the background color, background pattern, text color, text size and character type. In this case, the varied display mode may be applied to the entire record in which the method file concerned is displayed, or only a portion of the record.

According to this configuration, a user viewing the batch file on the display device can instantly determine, for each method file described in the batch file, whether the method file is a file describing an analysis condition of the liquid chromatograph or one describing an analysis condition of the supercritical fluid chromatograph.

The display controller may additionally be configured, for example, to display a batch file on the display device and show a mark (or the like) indicating the currently executed method file on the display screen while a series of analyses based on the batch file are being performed in the chromatograph apparatus. In this case, the user viewing the display can instantly determine whether an analysis in the liquid chromatograph mode or an analysis in the supercritical fluid chromatograph mode is ongoing.

It is also preferable for the display controller to be configured to display each item in the method files in a different display mode according to the content of the item. For example, if there is an "item describing the column to be used" in the method files, the fields in which the same column is described may be displayed in the same display mode, while the fields in which different columns are described may be displayed in display modes which differ from each other. The user viewing the batch file displayed on the screen can instantly determine which operating conditions are different from (or the same as) each other in the method files described in the batch file.

As a preferable mode, the control device may further include an order designation receiver configured to receive, from a user, a designation of the order of execution of the first-type method files and the second-type method files.

This configuration allows the user to freely select the order of execution of the analysis by the liquid chromatograph and the analysis by the supercritical fluid chromatograph.

As a preferable mode, the control device may further include:

a switching method file creator configured to create a switching method file describing an operating condition of a switching operation to be performed between an analysis by the liquid chromatograph and an analysis by the supercritical fluid chromatograph, where the batch file creator is further configured to insert the switching method file into a boundary section between the first-type method files and the second-type method files in the batch file.

Specific examples of the "switching operation" include the operation of replacing the mobile phase in tubes, columns or similar elements used in both analyses (i.e. the operation of replacing a mobile phase used in the previous analysis mode with a mobile phase to be used in the next analysis mode) as well as the operation of equilibrating the new mobile phase in the columns after the replacing operation.

It should be noted that specific operating conditions of the switching operation to be performed for the switching from an analysis by the liquid chromatograph to an analysis by the supercritical fluid chromatograph are different from those of the switching operation to be performed for the switching from an analysis by the supercritical fluid chromatograph to an analysis by the liquid chromatograph. This means that the switching method file creator should create two kinds of switching method files. The batch file creator selects one switching method file to be inserted into the boundary section between the first-type method files and the second-type method files according to the order of execution of these method files.

According to this configuration, the control device automatically creates the switching method file describing the operating conditions of the switching operation and inserts it in the batch file. The user does not need to manually perform the task of entering an instruction on the creation of the switching method file, an instruction on the section in the batch file into which the switching method file should be inserted, or other related tasks.

As a more preferable mode, the control device may further include:

a before-after instruction receiver configured to receive, from a user, an instruction on whether the switching operation is to be performed before a series of analyses described in the batch file or after the series of analyses, where the batch file creator is further configured to insert the switching method file into the first or last section of the batch file according to the instruction received by the before-after instruction receiver.

It should be noted that the switching method file creator creates two kinds of switching method files, as described earlier. The batch file creator selects one switching method file to be inserted into the first (or last) section of the batch file according to the order of execution of the first-type method files and the second-type method files in the batch file.

According to this configuration, after a series of analyses described in one batch file have been completed, the user does not need to once more perform the entry of the instructions for the switching operation or other related tasks before a series of analyses described in another batch file are initiated.

As a more preferable mode, the control device may be configured to select, as a mobile phase to be used for a switching operation performed between an analysis by a liquid chromatograph and an analysis by a supercritical fluid chromatograph, a mobile phase used in the analysis performed immediately before the switching operation.

According to this configuration, the purging time for the pumps can be saved, so that the period of time for the switching operation can be shortened.

The present invention is also aimed at providing a program. The program makes a computer function as a control device for controlling a chromatograph apparatus having both an analytical function using a liquid chromatograph and an analytical function using a supercritical fluid chromatograph, the program configured to make a computer realize:

a first-type method file creation function configured to create a first-type method file according to an instruction from a user, the first-type method file describing a condition of an analysis by a liquid chromatograph;

a second-type method file creation function configured to create a second-type method file according to an instruction from a user, the second-type method file describing a condition of an analysis by a supercritical fluid chromatograph; and a batch file creation function configured to create a batch file according to an instruction from a user after a group of method files including one or more first-type method files and one or more second-type method files are created, the batch file including a plurality of records describing the group of method files, with one method file in each record.

Advantageous Effects of Invention

The control device for a chromatograph apparatus according to the present invention makes it easy to manage analysis conditions, analysis results and other related information in a chromatograph apparatus having both an analytical function using a liquid chromatograph and an analytical function using a supercritical fluid chromatograph.

BRIEF DESCRIPTION OF DRAWINGS

FIG. 4 is a column/mobile phase registration window which is displayed in the present embodiment.

FIG. 5 is an SFC method file which is created in the present embodiment.

FIG. 7 is an LC method file which is created in the present embodiment.

FIG. 9 is a screen display of a batch file created in the present embodiment.

FIG. 10 is a screen display during an execution of analyses using a batch file created in the present embodiment.

DETAILED DESCRIPTION

An embodiment of the control device for a chromatograph apparatus according to the present invention is hereinafter described with reference to the drawings. The control device for a chromatograph apparatus according to the present is used to control an LC-SFC apparatus having both the function of a liquid chromatograph (LC) and that of a supercritical fluid chromatograph (SFC). The combination of the LC-SFC apparatus and the control device for a chromatograph apparatus is hereinafter called the "chromatograph analyzer system".

<1. System Configuration and Analysis Operation>

Figure 1:
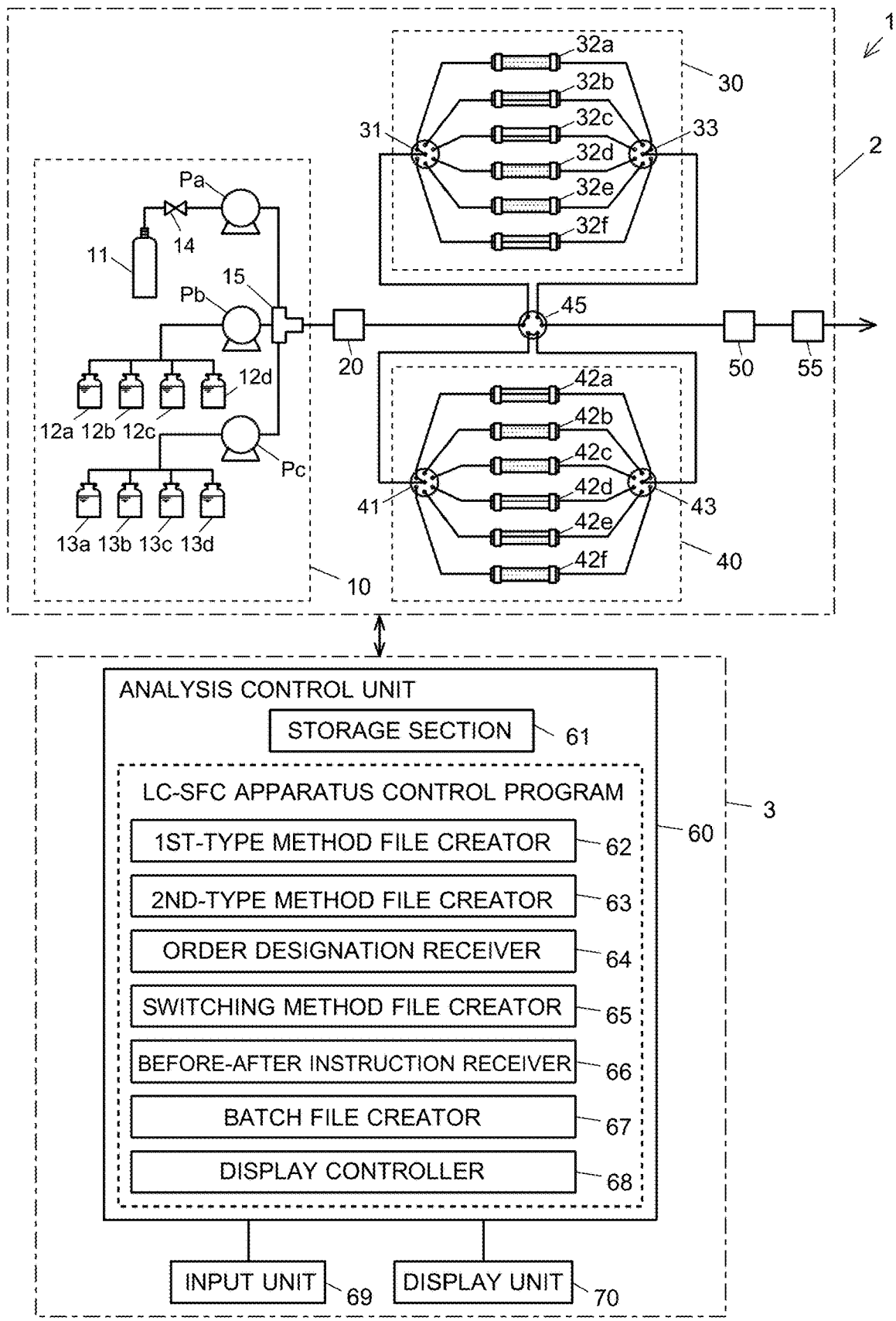
FIG. 1 is a configuration diagram showing the main components of a chromatograph analyzer system including a control device for a chromatograph apparatus according to the present invention.

FIG. 1 shows the configuration of the main components of the chromatograph analyzer system 1 according to the present embodiment. This chromatograph analyzer system 1 is roughly divided into an LC-SFC apparatus 2 and an LC-SFC apparatus control device 3.

The LC-SFC apparatus 2 includes a mobile-phase supply unit 10, auto-sampler 20, SFC column unit 30, LC column unit 40, detector unit 50 and back-pressure control unit 55. The mobile-phase supply unit 10 includes three sections: a supercritical fluid supply section having a cylinder 11 containing a supercritical fluid (in the present embodiment, carbon dioxide) and a pump Pa for supplying the supercritical fluid at a predetermined flow velocity (or flow rate); an organic solvent supply section having four liquid containers 12a-12d which respectively contain four kinds of organic solvents, as well as a pump Pb for supplying a mixture of the organic solvents mixed by a mixer (not shown), or one of those organic solvents, at a predetermined flow velocity (or flow rate); and a water-based solvent supply section having four liquid containers 13a-13d which respectively contain four kinds of water-based solvents, as well as a pump Pc for supplying a mixture of the water-based solvents mixed by a mixer (not shown), or one of those water-based solvents, at a predetermined flow velocity (or flow rate). The supercritical fluid or solvents from those supply units are mixed at a mixer 15 and supplied as the mobile phase.

The auto-sampler 20 contains a tray on which a plurality of vials each of which contains a sample are placed. According to a control signal received from the LC-SFC apparatus control device 3 (which will be described later), the auto-sampler 20 suctions a predetermined amount of sample from a specified vial and injects it into the flow of the mobile phase at a predetermined timing.

The passage on the downstream side from the auto-sampler 20 is connected to one of the ports of an SFC-LC passage-switching valve (six-port two-position valve) 45, which connects the passage to either the SFC column unit 30 or the LC column unit 40. One pair of ports neighboring each other in the SFC-LC passage-switching valve 45 are respectively connected to the common port of an inlet-side passage-switching valve 31 and that of an outlet-side passage-switching valve 33 in the SFC column unit 30. Another pair of ports neighboring each other are respectively connected to the common port of an inlet-side passage-switching valve 41 and that of an outlet-side passage-switching valve 43 in the LC column unit 40. The last remaining port is connected to the detector unit 50.

The SFC column unit 30 includes an inlet-side passage-switching valve 31, six SFC columns 32a-32f, and an outlet-side passage-switching valve 33. Each of the inlet-side and outlet-side passage-switching valves 31 and 33 is a seven-port six-position valve having one common central port surrounded by six ports. As described earlier, the common port of the inlet-side passage-switching valve 31 and that of the outlet-side passage-switching valve 33 are respectively connected to a pair of ports neighboring each other in the SFC-LC passage-switching valve 45. The six surrounding ports are respectively connected to the different SFC columns 32a-32f. The inlet-side passage-switching valve 31 and the outlet-side passage-switching valve 33 are switched so that one SFC column 32 is selectively connected to the passage.

The LC column unit 40 includes an inlet-side passage-switching valve 41, six LC columns 42a-42f, and an outlet-side passage-switching valve 43. Each of the inlet-side and outlet-side passage-switching valves 41 and 43 is a seven-port six-position valve having one common central port surrounded by six ports. As described earlier, the common port of the inlet-side passage-switching valve 41 and that of the outlet-side passage-switching valve 43 are respectively connected to a pair of ports neighboring each other in the SFC-LC passage-switching valve 45. The six surrounding ports are respectively connected to the different LC columns 42a-42f. The inlet-side passage-switching valve 41 and the outlet-side passage-switching valve 43 are switched so that so that one LC column 42 is selectively connected to the passage.

The detector unit 50 and the back-pressure control unit 55 are located on the downstream side from the SFC-LC passage-switching valve 45. The detector unit 50 in the present embodiment is an absorptiometer, in which a beam of light having a predetermined width of wavelength emitted from a light source is cast into a flow cell through which the mobile phase carrying the sample components is passed. The light transmitted through the flow cell is separated into wavelengths and detected with a photodiode detector. The back-pressure control unit 55 includes a back-pressure control valve and a valve-driving mechanism, which operates the back-pressure control valve according to a control signal from the LC-SFC apparatus control device 3.

When an SFC analysis is to be performed, the back-pressure control unit 55 is activated to maintain a predetermined level of pressure inside the passages. In this state, the passage in the SFC column unit 30 is connected to the SFC column 32 to be used in the analysis. Subsequently, the SFC-LC passage-switching valve 45 is operated to connect the SFC column unit 30. Then, the pumps Pa and Pb are energized to supply the mobile phase for SFC, and a sample is injected from the auto-sampler 20 into the mobile phase. The components in the sample are temporally separated from each other within the connected SFC column 32 in the SFC column unit 30. The separated components are sequentially eluted from the column and detected by the detector unit 50.

When an LC analysis is to be performed, the back-pressure control unit 55 is deactivated (the back-pressure valve is opened). In this state, the passage in the LC column unit 40 is connected to the LC column 42 to be used in the analysis. Subsequently, the SFC-LC passage-switching valve 45 is operated to connect the LC column unit 40. Then, the pumps Pb and Pc are energized to supply the mobile phase for LC, and a sample is injected from the auto-sampler 20 into the mobile phase. The components in the sample are temporally separated from each other within the connected LC column 42 in the LC column unit 40. The separated components are sequentially eluted from the column and detected by the detector unit 50.

When an LC analysis is to be performed after an SFC analysis, an analysis mode switching operation (for the SFC-to-LC switching) is performed. Specifically, after the SFC analysis has been completed, the back-pressure control unit 55 is deactivated (the back-pressure control valve is opened), and the pump Pa is deenergized, while the pump Pb is solely energized so that the fluid remaining in the passage used for the SFC analysis (i.e. the supercritical fluid (specifically, the carbon dioxide in a gasified state) and the organic solvent remaining in the passage after being used in the SFC analysis) are replaced by a predetermined organic solvent. Subsequently, after the passage in the LC column unit 40 is connected to the LC column 42 to be used in the analysis, the SFC-LC passage-switching valve 45 is operated, and the pumps Pb and Pc are energized so that the liquid in the passage to be used in the LC analysis is replaced by an organic solvent and a water-based solvent (mobile phase for LC). The operating conditions of such a series of operations are described in the switching method file and saved in a storage section 61 (which will be described later).

When an SFC analysis is to be performed after an LC analysis, an analysis mode switching operation (for the LC-to-SFC switching) is performed. Specifically, after the LC analysis has been completed, the pump Pc is deenergized and the pump Pb is solely energized so that the liquid remaining in the passage used in the LC analysis (i.e. the organic solvent and water-based solvent remaining in the passage after being used in the LC analysis) is replaced by a predetermined organic solvent. Subsequently, after the passage in the SFC column unit 30 is connected to the SFC column 32 to be used in the analysis, the back-pressure control unit 55 is activated, the SFC-LC passage-switching valve 45 is operated, and the pumps Pa and Pb are energized to replace the liquid in the passage to be used in the SFC analysis with the supercritical fluid and the organic solvent (mobile phase for SFC). The operating conditions of such a series of operations are described in the switching method file and saved in the storage section 61 (which will be described later).

The LC-SFC apparatus control device 3 includes an analysis control unit 60 as well as an input unit 69 and a display unit (display device) 70 connected to the analysis control unit 60. The analysis control unit 60 includes the following functional blocks other than the storage section 61: first-type method file creator 62, second-type method file creator 63, order designation receiver 64, switching method file creator 65, before-after instruction receiver 66, batch file creator 67 and display controller 68. The analysis control unit 60 is actually a personal computer, with the aforementioned functional blocks embodied by a CPU executing an LC-SFC apparatus control program. The operations of those components will be described later. The storage section 61 holds the switching method files mentioned earlier as well as base method files, column database, mobile phase database and other necessary data, which will be described later.

Figure 2:
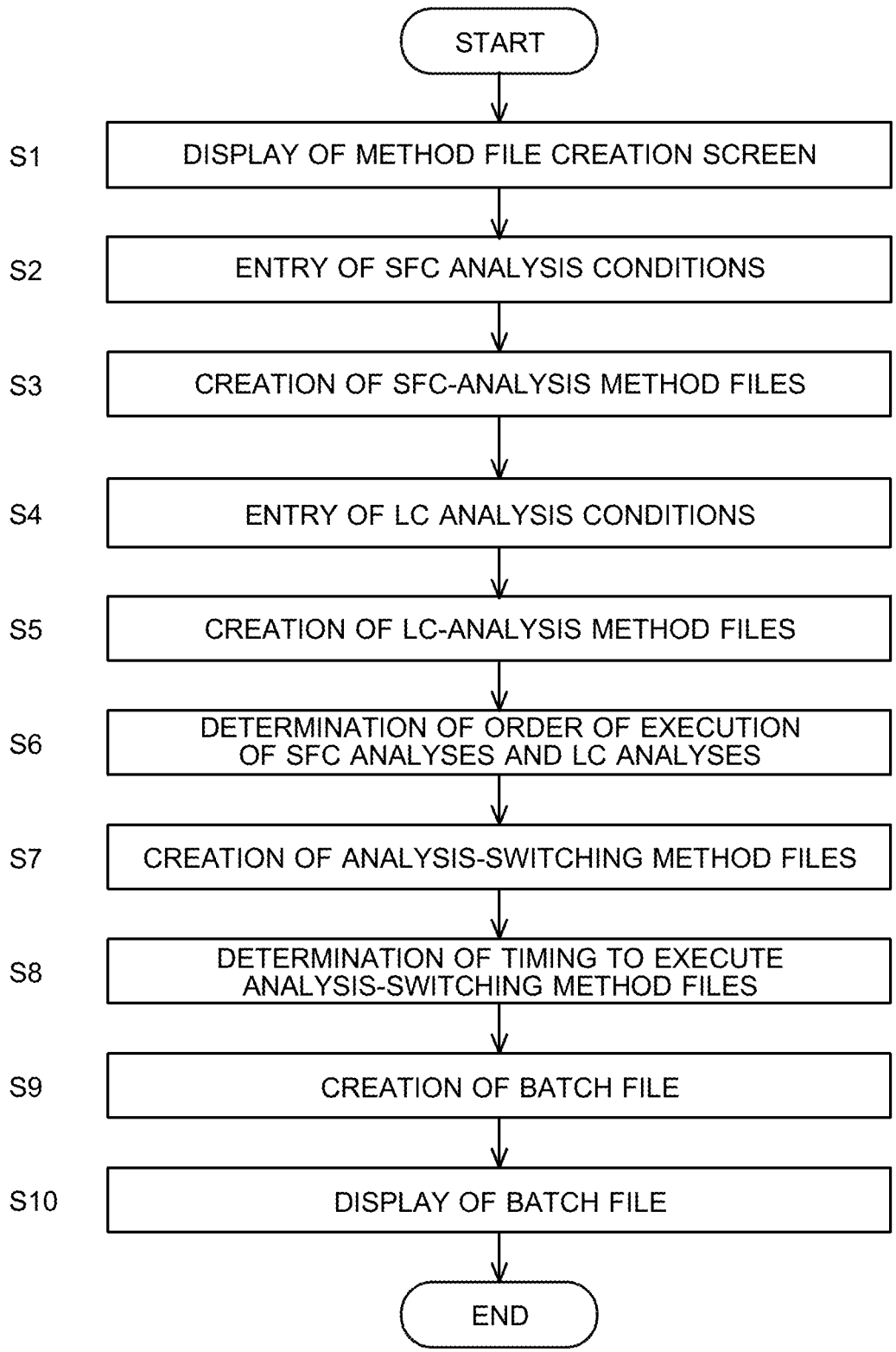
FIG. 2 is a flowchart illustrating the process of creating a batch file for performing analyses in the chromatograph analyzer system according to the present embodiment.

A batch-file creation operation which characterizes the LC-SFC apparatus control device 3 according to the present embodiment is hereinafter described by means of the flowchart in FIG. 2 and the screen examples (and the like) in FIGS. 3-7.

Figure 3:
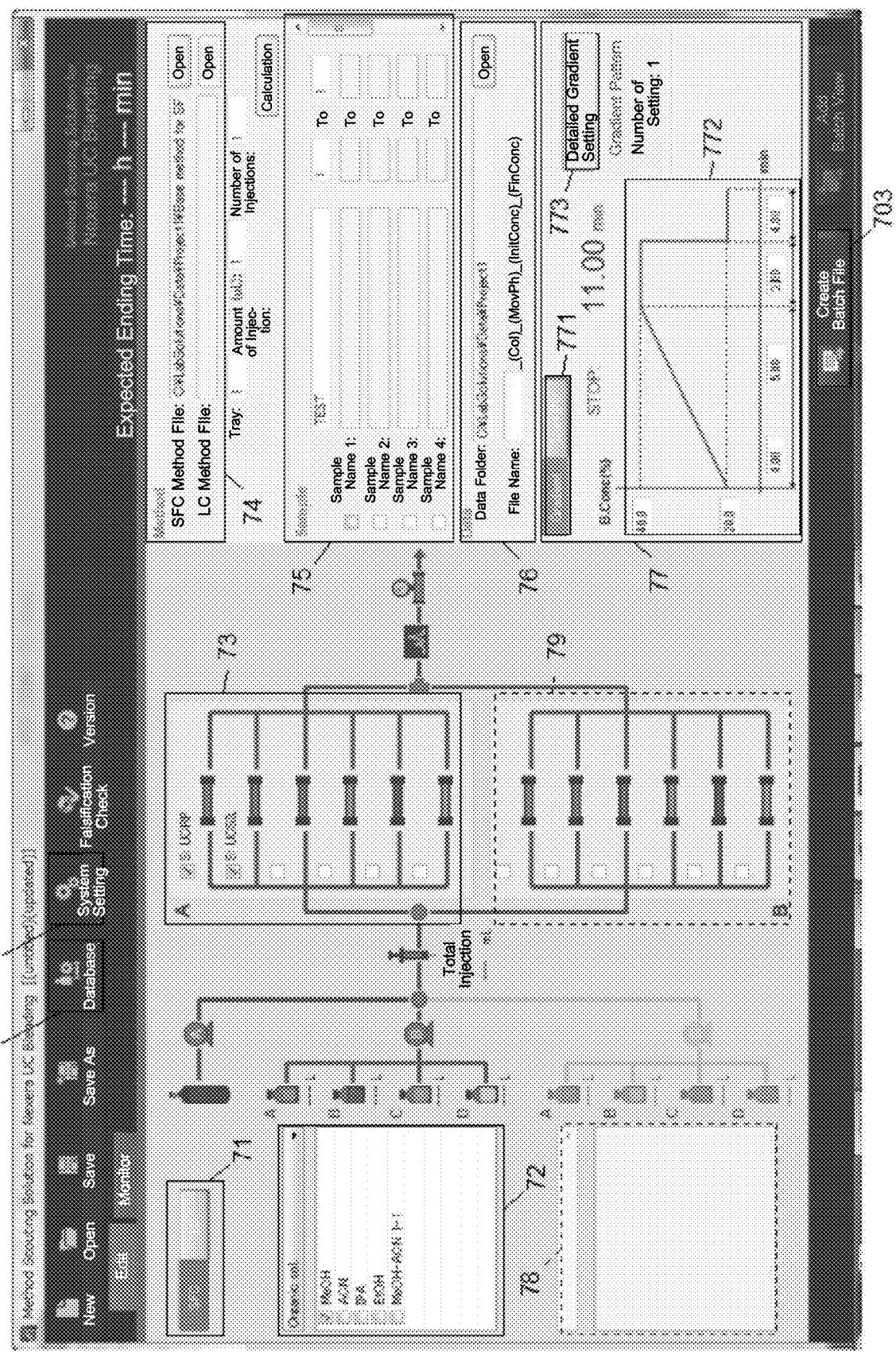
FIG. 3 is a display example of a method file creation window in the present embodiment, with "SFC" selected.

<2. Creation of Batch File>
<2.1 Creation of SFC-Analysis Method Files>
In response to a command to initiate an analysis issued by a user, the device displays a method file creation window shown in FIG. 3 on the display device 70 (Step S1). FIG. 3 shows the state of the method file creation window in which "SFC" of an analysis selection button 71 has been selected by the user. In the SFC analysis, the carbon dioxide (i.e. supercritical fluid) and organic solvents are used, while the water-based solvent is not used. Accordingly, the passage for the water-based solvent is shown in a pale color. An organic solvent selection area 72 lists selectable organic solvents along with the check boxes. The user selects one or more solvents to be used in the analysis by checking the corresponding boxes. The kinds of organic solvents listed in the organic solvent selection area 72 are previously registered through the column/mobile phase registration window shown in FIG. 4. In the lower section of a mobile phase registration window 82 shown in the lower portion of FIG. 4, a mobile phase candidate display area 823 is displayed, in which the mobile phases registered in the mobile phase database in the storage section 61 are listed along with their names and compositions. The user selects a desired mobile phase from this list. The selected mobile phase is displayed in a selection area 821. The user can register this mobile phase by pressing a registration button 822. The registered mobile phases are displayed in the organic solvent selection area 72 (or water-based solvent selection area 78, which will be described later).

The method file creation window has an SFC column selection area 73 and LC column selection area 79 displayed in the upper and lower portions of its central area, respectively. In FIG. 3, since "SFC" is selected with the analysis selection button 71, the LC column selection area 79 is shown in a pale color. The columns shown in the SFC column selection area 73 are previously registered through the column/mobile phase registration window shown in FIG. 4. This window is displayed, for example, in response to a user operation performed on a database icon 701 in the method file creation window. In the lower section of the column registration screen 81 shown in the upper portion of FIG. 4, a column candidate display area 813 is displayed, in which the name of each column registered in the column database in the storage section 61 is listed along with the kind of stationary phase, particle size of the stationary phase, diameter and length of the column as well as other related items of information. The user selects a desired column from this list. The selected column is displayed in a selection area 811. The user can register this column by pressing a registration button 812. The registered columns are displayed in the SFC column selection area 72 (or LC column selection area 79, which will be described later).

The method file creation window also has a method file reading screen 74 displayed in its upper right area. In response to a user operation specifying the storage location of a base method file in which standard analysis conditions are previously described, the device automatically reads the analysis conditions. In the present embodiment, a base method file named "SFC_analysis.lcm" (a method file in which basic analysis conditions are described) is read, whereby the SFC analysis conditions are set, such as a mobile-phase flow rate of 3 mL per minute, an SFC-column oven temperature of 35 degrees Celsius, a back pressure of 10 MPa, and the use of a photodiode array detector as the detector. The analysis conditions are applied as the common SFC analysis conditions to all samples which will be entered and set in a sample entry screen 75 (which will be described later). A base method file, such as the "SFC_analysis.lcm" file mentioned earlier, can be created or edited through a method-setting screen (or the like). The procedure and screen for the creation of the base method file are similar to the conventional ones, and therefore, will not be described in detail in the present embodiment.

The method file creation window also has a sample entry screen 75 displayed in the middle of its right area. The sample entry screen 75 allows the user to enter the sample name and the serial number of the vial which contain the sample. The auto-sampler 20 collects the sample based on the serial number of the vial entered on this screen.

Below the lower section of the sample entry screen 75, a data file setting screen 76 is displayed. The data file setting screen 76 allows the user to specify the name and storage location of the file in which the data acquired through an analysis are to be saved.

The method file creation window also has a gradient setting screen 77 displayed in the lower right area. In FIG. 3, the gradient analysis is selected with an analysis type selector 771. An analysis configurator 772 allows the user to change the content of the gradient analysis (the initial and final concentrations of the organic solvent to be supplied by the pump Pb, gradient of the concentration change, etc.), as well as to visually check the outline of the gradient analysis. For a more complex setting of the gradient analysis, a separate window which allows for the detailed setting can be opened by pressing a detailed gradient setting button 773.

After the items of information described to this point have been entered in the window shown in FIG. 3 (Step S2), the user issues a command to create a method file. Then, the second-type method file creator 63 creates a group of SFC-analysis method files in which the base method and the contents of the setting of the aforementioned items are reflected, as shown in FIG. 5 (Step S3).

<2.2 Creation of LC-Analysis Method Files>

Figure 6:
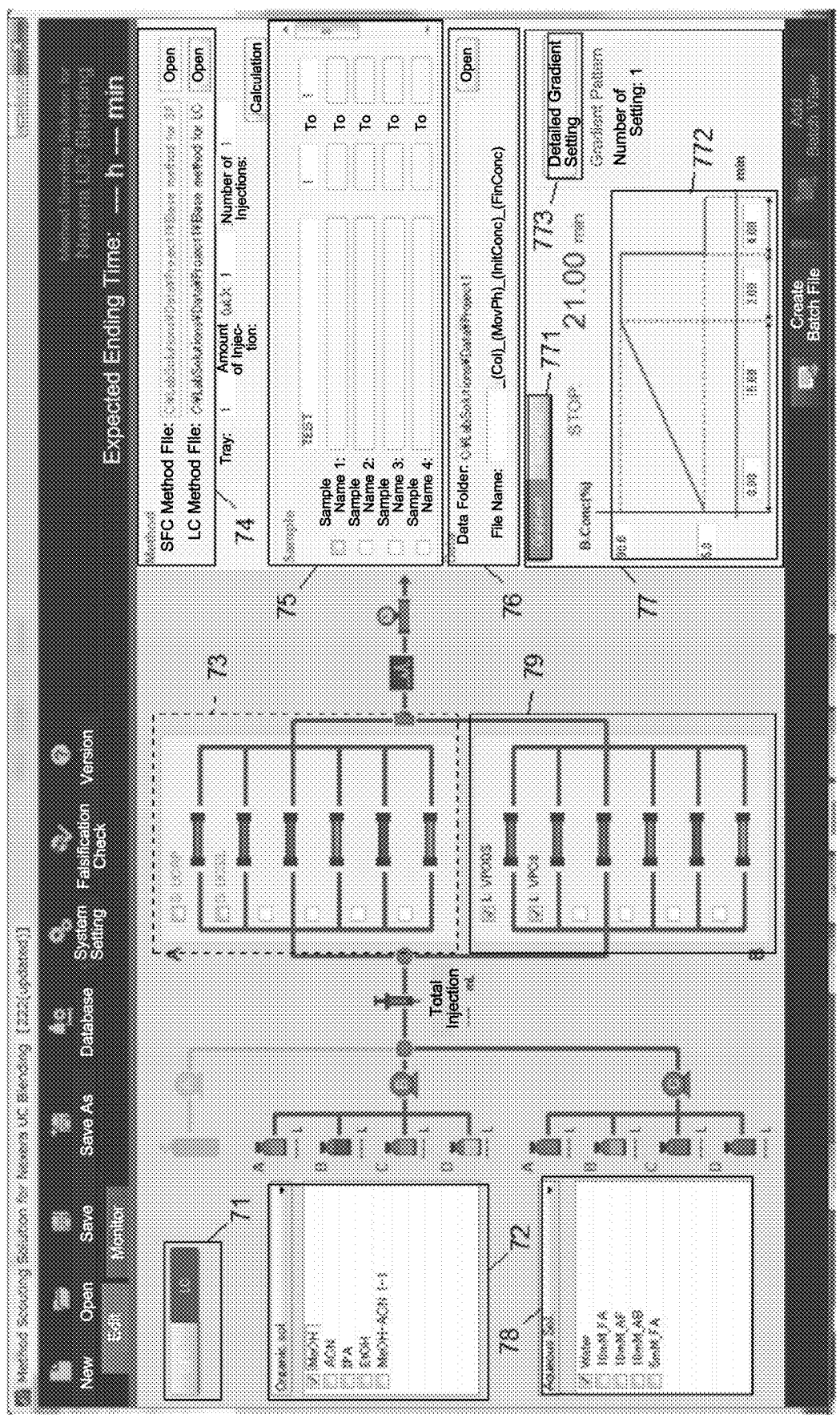
FIG. 6 is a display example of a method file creation window in the present embodiment, with "LC" selected.

FIG. 6 shows the state of the method file creation window in which "LC" of the analysis selection button 71 has been selected by the user. In the LC analysis, the organic solvent and the water-based solvent are used, while the supercritical fluid (carbon dioxide) is not used Accordingly, the passage for the supercritical fluid is shown in a pale color. The organic solvent selection area 72 and a water-based solvent selection area 78 respectively list selectable organic solvents and selectable water-based solvents along with the check boxes. The user selects one or more solvents to be used in the analysis by checking the corresponding boxes. As with the organic solvents mentioned earlier, the kinds of water-based solvents listed in the water-based solvent selection area 78 are previously registered in the column/mobile phase registration window shown in FIG. 4.

Figure 4:
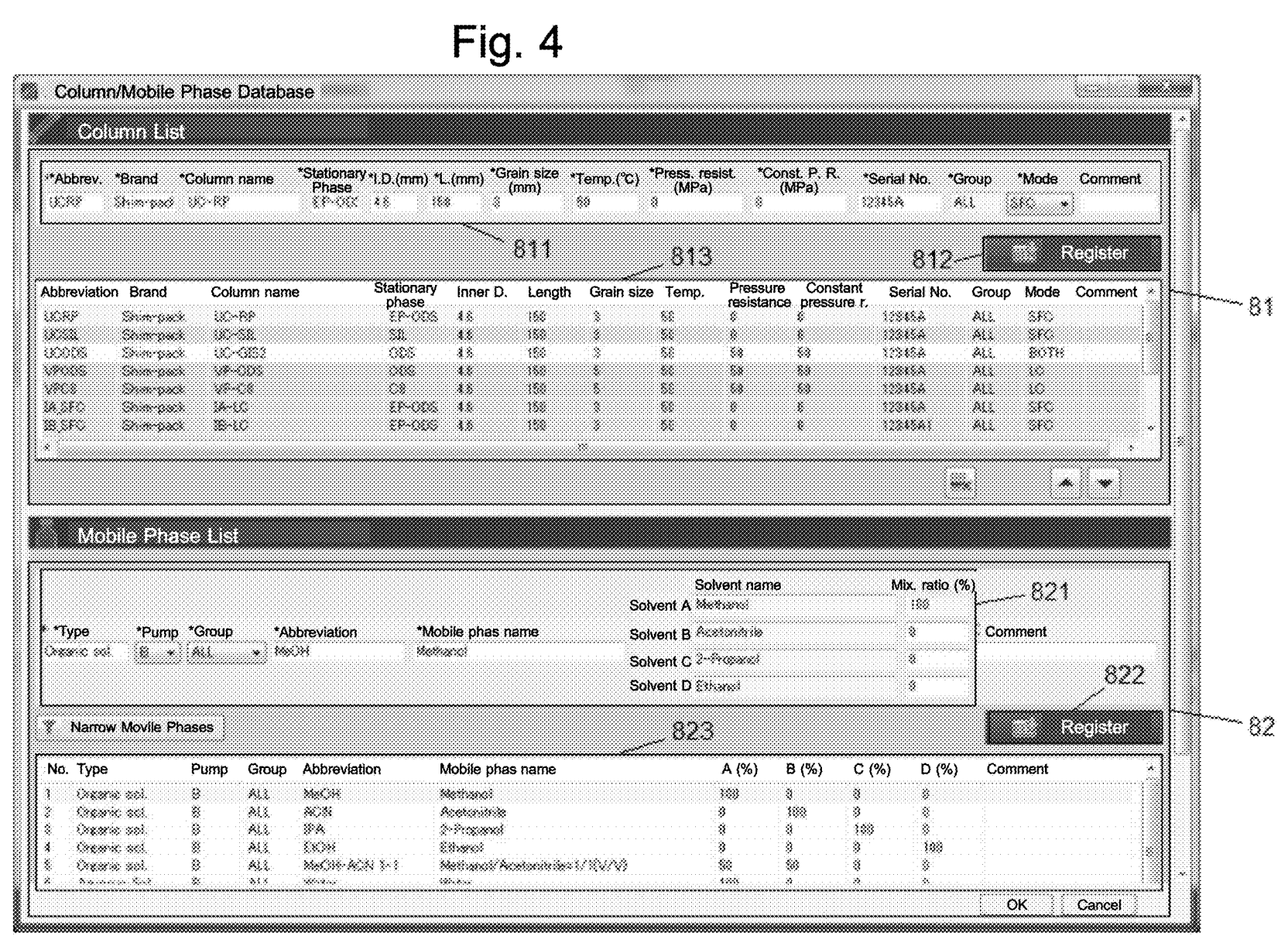

In the previously described case of FIG. 3, the LC column selection area 79 is shown in a pale color since "SFC" is selected with the analysis selection button 71. By comparison, in FIG. 6, the SFC column selection area 73 is shown in a pale color since "LC" is selected. The columns shown in the LC column selection area 79 are also previously registered in the column/mobile-phase registration window (FIG. 4).

The tasks of reading the base method file in the method file reading screen 74, entering the sample name and other pieces of information in the sample entry screen 75, entering the data file name and other pieces of information in the data file setting screen 76, as well as setting the gradient analysis conditions in the gradient setting screen 77, are similar to those of the SFC analysis. Therefore, those tasks will not be described. In the present embodiment, a base method file named "LC_analysis.lcm" (a method file in which basic analysis conditions are described) is read, whereby the LC analysis conditions are set, such as a mobile-phase flow rate of 2 mL per minute, an LC-column oven temperature of 35 degrees Celsius, and the use of a photodiode array detector as the detector.

After the items of information described to this point have been entered in the window shown in FIG. 6 (Step S4), the user issues a command to create a method file. Then, the first-type method file creator 62 creates a group of LC-analysis method files in which the base method and the contents of the setting of the aforementioned items are reflected, as shown in FIG. 7 (Step S5).

<2.3 Designation of Order of Execution of SFC Analysis and LC Analysis>

Figure 8:
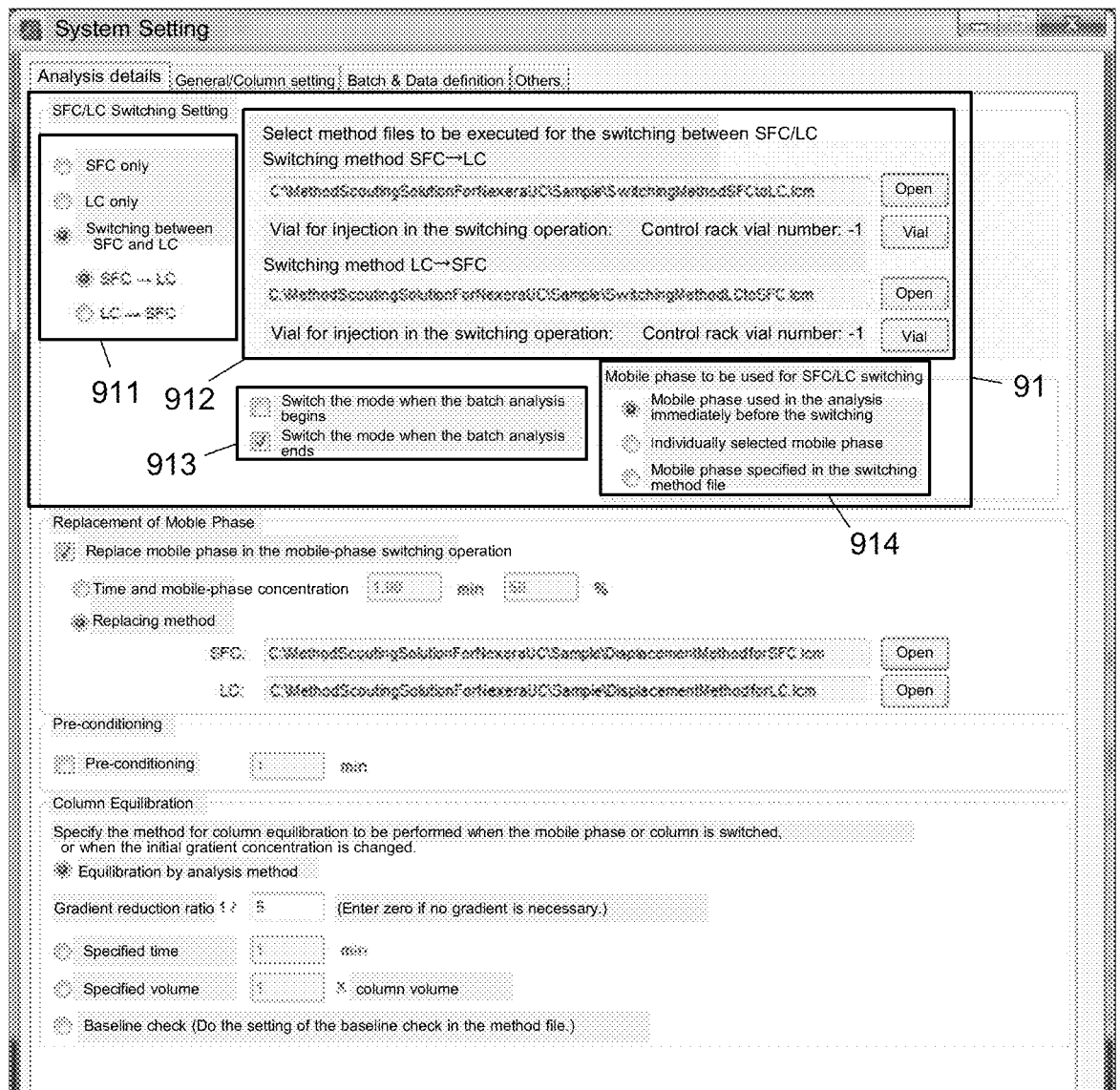
FIG. 8 is an order designation receiving window which is displayed in the present embodiment.

In response to a user operation performed on a system setting icon 702 displayed in the method file creation window, the order designation receiver 64 displays an order designation receiving window shown in FIG. 8. The order designation receiving window includes an SFC/LC switching setting section 91. Located in the left portion of this SFC/LC switching setting section 91 is an analysis selector 911 for selecting execution of SFC analysis only, execution of LC analysis only, or switching between SFC and LC analyses. In the case of switching between SFC and LC analyses, the order of their execution should also be selected ("SFC→LC" or "LC→SFC"). Base on the selection of the order of execution by the user in this analysis selector 911, the order designation receiver 64 determines the order of execution of the SFC-analysis method files and the LC-analysis method files created in the previous steps (Step S6).

<2.4 Specification of Switching Method File>

Located in the right portion of the SFC/LC switching setting section 91 is a switching method file specification area 912 for specifying a switching method file for an analysis mode switching operation which should be performed for each of the SFC-to-LC switching and LC-to-SFC switching. A plurality of switching method files are previously created by the switching method file creator 65 and stored in the storage section 61, each file describing the operating conditions related to the analysis mode switching operation. In the switching method file specification area 912, the user specifies a switching method file for the SFC-to-LC switching operation and a switching method file for the LC-to-SFC switching operation by selecting, for each of the switching operations, one of the switching method files stored in the storage section 61. In response to the specification of the files by the user, the switching method file creator 65 reads the conditions of the execution of the analysis switching operation described in the specified files and creates the switching method files including the same set of fields as shown in FIGS. 5 and 7 (Step S7). An appropriate dummy code (in the present embodiment, −1) is set in a field which must have an input value (e.g. vial number).

<2.5 Determination of Timing to Execute Switching Method>

Located in the lower portion of the SFC/LC switching setting section 91 is a before-after switching selector 913 for receiving the selection on whether or not the analysis mode switching operation should be performed before or after a series of analyses (batch analysis) described in the batch file. If the user has selected the execution of the analysis mode switching operation before or after a batch analysis in the before-after switching selector 913, the before-after instruction receiver 66 determines the timing to execute the switching method file according to the entered instruction (Step S8). Which of the two switching method files for the SFC to LC and LC-to-SFC switching operations should be executed at the determined timing can be decided from the order of execution determined by the order designation receiver 64.

For example, if the order of execution is "SFC to LC", the switching method file for the LC-to-SFC switching operation should be executed before or after the batch analysis.

<2.6 Selection of Mobile Phase to Be Used for Switching Operation>

In the window shown in FIG. 8, an item 914 labelled "Mobile phase to be used for SFC/LC switching" is provided. This is the item for selecting the predetermined organic solvent to be used for replacing the mobile phase in the passage in the analysis mode switching operation (each of the SFC-to-LC and LC-to-SFC switching operations). If the option labeled "Mobile phase used in the analysis immediately before the switching" is selected in this item 914, the mobile phase (organic solvent) used in the analysis immediately before the switching operation is used as the organic solvent to be used for replacing the mobile phase in the passage in the analysis mode switching operation. This reduces the purging time for the pumps and shortens the time required for the replacing operation (and consequently, the time required for the analysis mode switching operation). If the option labeled "Individually selected mobile phase" is selected in the item 914, an organic solvent is individually selected based on a user operation and used for the replacing operation. In this case, if the organic solvent used in the analysis immediately before the switching operation is not sufficiently effective for the replacement, a sufficient level of replacing effect can be achieved by selecting, for example, an organic solvent having a high eluting power. The second option also allows an organic solvent to be selected for the replacing operation in the case where the mobile phase used in the analysis immediately before the switching operation contains water and is not a 100% organic solvent. If the option labeled "Mobile phase specified in the switching method file" is selected in the item 914, the organic solvent written in the switching method file is selected for the replacing operation.

The window shown in FIG. 8 allows for not only the setting related to the switching between the SFC and LC analyses but also the settings related to the replacement of the mobile phase, pre-conditioning, necessity of column equilibration, and conditions under which the column equilibration should be performed. In the present embodiment, this window allows the user to instruct the device to perform the replacement of the mobile phase under the conditions described in the switching method file when the switching of the mobile phase is performed. The same window also allows the user to instruct the device to perform column equilibration when the mobile phase has been switched, when the column has been switched, as well as when the initial gradient concentration has been changed. The column equilibration is an operation for conditioning the inside of the column by passing a mobile phase at the initial concentration after the elution of a target component has been completed in a gradient analysis (or the like). The column equilibration is normally performed at the end of one analysis. The preconditioning means that the column equilibration is performed before the sample is injected.

<2.7 Creation of Batch File>

In response to a user operation performed on a batch file creation icon 703 displayed in the method file creation window, the batch file creator 67 creates a batch file (Step S9). That is to say, the batch file creator 67 sorts one or more SFC-analysis method files created in Step S3 and LC-analysis method files created in Step S5 in order of execution specified by the user. Then, the batch file creator 67 inserts the switching method files (the switching method file for the SFC-to-LC switching operation, or the switching method file for the LC-to-SFC switching operation) specified by the user into the (boundary) section between the two kinds of method files. If instructed by the user, the batch file creator 67 also inserts the switching method files before the first analysis method file (or after the last analysis method file).

FIG. 9 shows a batch file which is created in the present embodiment. This batch file is a list of methods each of which corresponds to one record. The records having values of "SFC1", "SFC2", etc. in the "Analysis" field are SFC-analysis method files, while the records having values of "LC1", "LC2", etc. are LC-analysis method files. Based on the above-described settings, this batch file includes the group of SFC-analysis method files, followed the group of LC-analysis method files, with the SFC-to-LC switching method files (records 12 and 13) in between. Additionally, the LC-to-SFC switching method files (records 1 and 2) are located before the first SFC-analysis method file. A column equilibration method file (record 7) is inserted between the method files before and after the switching of the column used for the SFC analyses. Another column equilibration method file (record 18) is inserted between the method files before and after the switching of the column used in the group of LC analyses.

<2.8 Display of Batch File>

After the batch file has been created, the display controller 68 displays the created batch file on the display unit 70 (Step S10). Boundary lines (in FIG. 9, thick lines) which separate the group of SFC-analysis method files and the group of LC-analysis method files from the other kinds of method files (e.g. switching method files) are displayed to improve the visibility. The SFC-analysis method files and the LC-analysis method files are distinguished from each other by different background colors in the field showing the name of the base method file. The types of columns to be used in those methods are also respectively displayed in different colors. Those colors are expressed by different hatching patterns in FIG. 9. Such a coloring scheme makes it easy for the user to visually understand which of the SFC and LC analyses will be executed by each method file as well as which columns will be used in those analyses.

In response to a command issued by the user to initiate an analysis using the created batch file, the display controller 68 displays the batch file showing only the main fields of the method files on the display unit 70, as shown in FIG. 10. A status bar 95 which indicates the currently executed method file is superposed on the batch file. This allows the user to easily check the execution status of the analysis after the initiation of the series of analyses.

As described to this point, in the present embodiment, a single batch file can be obtained in which the first-type method files describing the conditions of analyses by the liquid chromatograph and the second-type method files describing the conditions of analyses by the supercritical fluid chromatograph are described. With this file, the user can manage analysis conditions, analysis results and other related information within a single batch sequence. Accordingly, the management of those pieces of information will be easier.

The previous embodiment is a mere example and can be appropriately changed in accordance with the spirit of the present invention. Any of the display screens in the previous embodiment is a mere example and can be configured to be displayed in any appropriate form. The contents of the analysis methods as well as their names in the previous embodiment are also mere examples and can be appropriately changed. The hardware configuration of the valves, columns and other elements as well as the connection form of those elements in the analyzing apparatus which performs LC and SFC analyses in a switchable manner are not limited to the configuration shown in FIG. 1. Any configuration may be adopted as long as the device can perform LC and SFC analyses in a switchable manner.

In the previously described embodiment, the name of the base method file for the SFC-analysis method files and that of the base method file for the LC-analysis method files in the batch file are displayed in different colors. The types of columns are also respectively displayed in different colors. Those pieces of information may be shown in any display mode which makes them visually different from each other. The visually discriminable display can be achieved not only by varying the background color, but also by varying the background pattern, text color, text size, character type, etc. The varied display mode may be applied to the entire record in which the method file concerned is displayed, or only a portion of the record.

In the previous embodiment, the operations for receiving various designations or specifications from the user through the order designation receiving window (Steps S6 through S8) are performed after the creation of the method files (Steps S2 to S5). Those operations may be performed before the creation of the method files, or even in the middle of it. In the previous embodiment, the creation of the SFC-analysis method files is followed by that of the LC-analysis method files. Those two kinds of files may be created in reverse order, or they may be alternately created.

The invention claimed is:

1. A control device for controlling a chromatograph apparatus having an analytical function using a liquid chromatograph and an analytical function using a supercritical fluid chromatograph, the control device comprising:
   a first-type method file creator configured to create a first-type method file according to an instruction from a user, the first-type method file describing a condition of an analysis by the liquid chromatograph;
   a second-type method file creator configured to create a second-type method file according to an instruction from a user, the second-type method file describing a condition of an analysis by the supercritical fluid chromatograph; and
   a batch file creator configured to create a batch file according to an instruction from a user, the batch file including a plurality of records describing a plurality of method files, with one method file in each record, the plurality of method files including a first-type method-file group followed by a second-type method-file group, or the second-type method-file group followed by the first-type method-file group, the first-type method-file group consisting of a plurality of the first-type method files, and the second-type method-file group consisting of a plurality of the second-type method files.

2. The control device for controlling a chromatograph apparatus according to claim 1, further comprising:
   a display controller configured to display the batch file on a display device,
   wherein the display controller is further configured to display the first-type method files and the second-type method files in respective display modes which differ from each other.

3. The control device for controlling a chromatograph apparatus according to claim 1, further comprising:

an order designation receiver configured to receive, from a user, a designation of an order of execution of the first-type method-file group and the second-type method-file group, wherein the batch file creator is further configured to create the batch file including the plurality of records describing the plurality of method files, with one method file in each record, according to the order of execution received by the order designation receiver, the plurality of method files including the first-type method-file group followed by the second-type method-file group, or the second-type method-file group followed by the first-type method-file group.

4. The control device for controlling a chromatograph apparatus according to claim 1, further comprising:

a switching method file creator configured to create a switching method file describing an operating condition of a switching operation to be performed between an analysis by the liquid chromatograph and an analysis by the supercritical fluid chromatograph, wherein the batch file creator is further configured to insert the switching method file into a boundary section between the first-type method-file group and the second-type method-file group in the batch file.

5. The control device for controlling a chromatograph apparatus according to claim 4, further comprising:

a before-after instruction receiver configured to receive, from a user, an instruction on whether the switching operation is to be performed before a series of analyses described in the batch file or after the series of analyses, wherein the batch file creator is further configured to insert the switching method file into a first or last section of the batch file according to the instruction received by the before-after instruction receiver.

6. The control device for controlling a chromatograph apparatus according to claim 4, further comprising:

an order designation receiver configured to receive, from a user, a designation of an order of execution of the first-type method-file group and the second-type method-file group, wherein:

the batch file creator is further configured to create the batch file including the plurality of records describing the plurality of method files, with one method file in each record, according to the order of execution received by the order designation receiver, the plurality of method files including the first-type method-file group followed by the second-type method-file group, or the second-type method-file group followed by the first-type method-file group; and the switching method file is prepared for performing a switching operation according to the order of execution received by the order designation receiver.

7. The control device for controlling a chromatograph apparatus according to claim 1, wherein the control device is configured to select, as a mobile phase to be used for a switching operation performed between an analysis by the liquid chromatograph and an analysis by the supercritical fluid chromatograph, a mobile phase used in the analysis performed immediately before the switching operation.

8. A non-transitory computer readable medium recording a program for making a computer function as a control device for controlling a chromatograph apparatus having both an analytical function using a liquid chromatograph and an analytical function using a supercritical fluid chromatograph, wherein the program is configured to make the computer realize:

a first-type method file creation function of creating a first-type method file according to an instruction from a user, the first-type method file describing a condition of an analysis by the liquid chromatograph;

a second-type method file creation function of creating a second-type method file according to an instruction from a user, the second-type method file describing a condition of an analysis by the supercritical fluid chromatograph; and a batch file creation function of creating a batch file according to an instruction from a user, the batch file including a plurality of records describing a plurality of method files, with one method file in each record, the plurality of method files including a first-type method-file group followed by a second-type method-file group, or the second-type method-file group followed by the first-type method-file group, the first-type method-file group consisting of a plurality of the first-type method files, and the second-type method-file group consisting of a plurality of the second-type method files.

9. A method for creating a batch file for controlling a chromatograph apparatus having an analytical function using a liquid chromatograph and an analytical function using a supercritical fluid chromatograph, the method comprising the steps of:

creating a first-type method file according to an instruction from a user, the first-type method file describing a condition of an analysis by the liquid chromatograph;

creating a second-type method file according to an instruction from a user, the second-type method file describing a condition of an analysis by the supercritical fluid chromatograph; and creating a batch file according to an instruction from a user, the batch file including a plurality of records describing a plurality of method files, with one method file in each record, the plurality of method files including a first-type method-file group followed by a second-type method-file group, or the second-type method-file group followed by the first-type method-file group, the first-type method-file group consisting of a plurality of the first-type method files, and the second-type method-file group consisting of a plurality of the second-type method files.

* * * * *